US012365222B2

(12) United States Patent
Sievers et al.

(10) Patent No.: US 12,365,222 B2
(45) Date of Patent: Jul. 22, 2025

(54) HEAT EXCHANGER AND METHOD OF OPERATION

(71) Applicant: MAHLE International GmbH, Stuttgart (DE)

(72) Inventors: Martin Sievers, Kernen im Remstal (DE); Uwe Foerster, Erdmannhausen (DE)

(73) Assignee: Mahle International GmbH, Stuttgart (DE)

( * ) Notice: Subject to any disclaimer, the term of this patent is extended or adjusted under 35 U.S.C. 154(b) by 244 days.

(21) Appl. No.: 18/124,884

(22) Filed: Mar. 22, 2023

(65) Prior Publication Data

US 2023/0322050 A1 Oct. 12, 2023

(30) Foreign Application Priority Data

Mar. 23, 2022 (DE) ...................... 10 2022 202 823.6

(51) Int. Cl.
| | |
|---|---|
| *F01P 7/10* | (2006.01) |
| *B60H 1/00* | (2006.01) |
| *B60H 1/32* | (2006.01) |
| *F28F 1/12* | (2006.01) |
| *F28F 17/00* | (2006.01) |

(52) U.S. Cl.
CPC ....... *B60H 1/3233* (2013.01); *B60H 1/00664* (2013.01); *F28F 1/12* (2013.01); *F28F 17/00* (2013.01)

(58) Field of Classification Search
CPC ..... B60H 1/3233; B60H 1/00664; F28F 1/12; F28F 17/00

USPC ......................................................... 165/198
See application file for complete search history.

(56) References Cited

U.S. PATENT DOCUMENTS 7,385,810 B2 * 6/2008 Chu ................... H05K 7/2079
361/679.48
2006/0042778 A1 3/2006 Stevenson

FOREIGN PATENT DOCUMENTS

| DE | 602005001241 T2 | 1/2008 |
| DE | 102012218873 A1 * | 3/2013 |
| DE | 102020200078 A1 | 7/2021 |
| DE | 102020112293 A1 | 11/2021 |
| EP | 1470010 B1 | 7/2007 |

* cited by examiner

*Primary Examiner* — Davis D Hwu
(74) *Attorney, Agent, or Firm* — Muncy, Geissler, Olds & Lowe, P.C.

(57) ABSTRACT

A heat exchanger of an electrically driven motor vehicle, which includes a tube/rib block having a multiplicity of tubes and having a multiplicity of ribs. The tubes being arranged essentially in parallel to each other and spaced a distance apart, and the ribs each being arranged between two adjacent tubes. The ribs touching the two adjacent tubes, at least one manifold being arranged on one of the sides of the tube/rib block for the purpose of supplying fluid to tubes of the tube/rib block and for removing fluid from tubes of the tube/rib block. A cover device is arranged downstream and/or upstream from the tube/rib block for controlling the air flow through the tube/rib block temporarily or in certain regions for the defined removal of water from the tube/rib block. A method for operating a heat exchanger is also provided.

13 Claims, 5 Drawing Sheets

HEAT EXCHANGER AND METHOD OF OPERATION

This nonprovisional application claims priority under 35 U.S.C. § 119(a) to German Patent Application No. 10 2022 202 823.6, which was filed in Germany on Mar. 23, 2022, and which is herein incorporated by reference.

BACKGROUND OF THE INVENTION

Field of the Invention

The invention relates to a heat exchanger, in particular for a refrigerant circuit or a coolant circuit, in particular for a refrigerant circuit of an electrically driven motor vehicle, and a method for operating the heat exchanger.

Description of the Background Art

A refrigerant circuit is used in electrically driven motor vehicles for cooling and possibly also for heating the passenger compartment, this refrigerant circuit being usable, on the one hand, in an air-conditioning mode and, on the other hand, also in a heat pump mode, also referred to as heating mode, as a heat pump circuit.

A refrigerant circuit of this type includes an outer heat exchanger, which is used as a condenser in air-conditioning mode and cools and condenses the through-flowing gaseous refrigerant, while the air flowing through the heat exchanger is heated in heat transfer with the refrigerant. In heat pump mode, the outer heat exchanger is used as an evaporator, in which the refrigerant flowing through the heat exchanger is heated and evaporated, while the air flowing through the heat exchanger is cooled. During this cooling of the air, the humidity present in the air may be at least partially condensed out and precipitate as water onto the ribs and tubes of the tube/rib block of the heat exchanger. This water may accumulate in the region of the tube/rib block and reduce the flow cross-section of the tube/rib block for the air. This decreases the effectiveness of the heat exchanger, which is undesirable.

This can be remedied to a certain extent by providing a fan, which generates an air flow, which flows through the heat exchanger. The air flow from the fan may press or suck water out of the tube/rib block, depending on whether the heat exchanger is arranged downstream or upstream from the fan.

Two mechanisms basically exists, with which the water may be removed from the tube/rib block of the heat exchanger.

The first mechanism is based on the pressure difference for the air via the flow through the tube/rib block. If the pressure difference over the tube/rib block of the heat exchanger is high enough locally to overcome the capillary forces, which bind the water to the tube/rib block, the water may be locally pressed or sucked out of the tube/rib block.

A second mechanism is water being carried along by the air flow through the tube/rib block. At the start of the water removal, the tube/rib block of the heat exchanger is filled with water to a large extent. As a result, it constitutes a great flow resistance. If only a small volume flow of air is transported by the fan in this situation, this results in a great pressure drop as the pressure difference at the heat exchanger.

The more water is locally removed from the tube/rib block, the lower is the flow resistance which the heat exchanger still represents with the existing leftover water. However, since the water is not uniformly removed from the tube/rib block of the heat exchanger, local regions result, in which very little water is still present, as well as regions which are still filled with a significant amount of water.

Since the flow resistance of the tube/rib block has been reduced due to the partial removal of the water, the fan correspondingly transports a larger air mass flow. As a result, the longer the fan is in operation, the less is the likelihood that a region of the tube/rib block, which was initially blown/sucked free, continues to be blown/sucked free during the further progression.

Since the fan provides an annular region from which the air flow emerges, an uneven flow occurs at the heat exchanger, due to the transition of the air flow from the annular flow cross-section of the fan to the angular cross-section of the heat exchanger, so that an uneven blowing/sucking out of the water of the heat exchanger is also favored.

If the tubes of the tube/rib block are arranged horizontally, the water transport in the vertical direction from tube to tube is largely prevented by the separation over the tubes. There is no difference in height within the rib of the tube/rib block for the purpose of conducting the condensation out of the heat exchanger via the pressure of the rising water column. In this installation position, the heat exchanger not only may become completely filled with water, but it may also continuously store this water. A situation may thus arise, in which virtually no water would run out of the heat exchanger without an external force. The mass flow of the outflowing condensed water without an air through-flow of the tube/rib block is vanishingly small.

If an air flow is applied with the aid of the fan, different regions in the tube/rib block having an elevated water load and regions which have been blown/sucked free still remain during and after the blowing/sucking out process, since compensating flows within the rib, which is typically designed as a corrugated rib, practically do not occur in a horizontally oriented rib.

Another disadvantage is that the regions of elevated water load tend particularly strongly toward harmful icing and, as a result, less heat is transferred from the air to the refrigerant in these regions than in the regions blown/sucked free of water.

In a vertical arrangement of the tubes in the tube/rib block, the condensed water within the rib may flow out in the direction of the gravitational force. Individual rib bends of the rib may be partially filled with water, and a water column typically accumulates at the lower end of the rib. The height of the water column correlates with the capillary forces which hold the water in the rib. Due to the local limitation of the water accumulation, it is not reliably possible to remove the water via the air flow induced by a fan, since the air flow in the lower region of the heat exchanger tends to be weak.

SUMMARY OF THE INVENTION

It is therefore an object of the present invention to provide a heat exchanger, in particular for a refrigerant circuit or a coolant circuit, in particular for an electrically driven motor vehicle, which is improved with respect to avoiding an accumulation of water. One object is also to provide a method for operating a heat exchanger of this type, for the purpose of avoiding or reducing an accumulation of water or of removing a water accumulation. The operation of the heat exchanger corresponds accordingly to a method for removing water from a heat exchanger which has accumulated on the surface of the heat exchanger, such as condensation.

An exemplary embodiment of the invention relates to a heat exchanger, in particular of an electrically driven motor vehicle, which includes a tube/rib block having a multiplicity of tubes and having a multiplicity of ribs, the tubes being arranged essentially in parallel to each other and spaced a distance apart, and the ribs each being arranged between two adjacent tubes, and the ribs touching the two adjacent tubes, at least one manifold being arranged on one of the sides of the tube/rib block for the purpose of supplying fluid to tubes of the tube/rib block and/or removing fluid from tubes of the tube/rib block, a cover device being provided, which is arranged downstream and/or upstream from the tube/rib block for controlling the air flow through the tube/rib block temporarily or in certain regions for the defined removal of water from the tube/rib block. The air flow passing over the heat exchanger is used thereby, in particular, not to flow into the entire tube/rib block but to flow only into regions thereof, so that the entire air flow passes over a smaller surface area and thus has a higher flow velocity in order to carry along and remove water.

A fan may be used and driven for this purpose, which may be arranged upstream or downstream from the heat exchanger, so that the air flow passing into the heat exchanger provides a predefined air volume, in particular it may provide a maximum transportable air volume, which may be specific to the fan used.

Correspondingly, the particular region may be flowed into and freed of water, so that the region may be subsequently closed again and another region released for the purpose of removing water therefrom. This may generally be done in such a way that all regions are flowed into and water removed therefrom consecutively, or only regions are flowed into and water removed therefrom which are specific to the water accumulation. This may depend, for example, on the orientation of the tubes of the tube/rib block. For example, if the tubes are oriented horizontally, the inflow and water removal of the tube/rib block in the entire region may be sensible. The tubes are oriented vertically, for example, it may possibly also be sufficient if only one lower region of the tube/rib block is subjected to an inflow and water removal of the tube/rib block, because the gravitational force effectuates an outflow of the water from the upper regions in the direction of the lower regions.

The cover device can have a plurality of regions to which air flow control elements are assigned, which may be actuated individually, in groups, and/or together for the purpose of releasing or blocking an air flow through the region, so that a region of the tube/rib block assigned to the region of the cover device has air flowing or not flowing through it. Due to the arrangement of air flow control elements in certain regions, with a given air flow, this air flow may be directed into the different regions when the particular air flow control element releases the region. A water removal may then take place in this region. Once the water has been removed, for example after the expiration of a predefined time period, the air flow control element of the one region may be closed again, and another air flow control element may possibly be opened to remove water from a further region.

Valve elements can be provided as air flow control elements, which are designed, for example, as vane valves, butterfly valves, and/or as wing valves, which are rotatably coupled to at least one carrier element. The surface area of the tube/rib block may be divided into different regions thereby, to each of which a correspondingly arranged valve element is assigned. The valve elements may be arranged in a space-saving manner and are easy to actuate. In the case of vane valves, it may be advantageous if the joint of the vane valve is arranged near the tube/rib block, which saves installation space and effectuates a defined through-flow of the particular region.

At least one louver arrangement can have a plurality of valves formed as the air flow control elements. A narrow design in the air flow direction may be achieved thereby.

The cover device can include at least one rolling strip as the air flow control element, which has at least one strip region with at least one through-opening, the strip region having a movable design, so that the at least one through-opening may be movably arranged in a defined manner along an end face of the tube/rib block. This achieves the fact that the required installation space is very small and yet a good controllability of the through-flow region may take place.

The cover device can essentially directly abut at least one end face of the tube/rib block or is arranged adjacent to at least one end face of the tube/rib block or is arranged at a distance from at least one end face of the tube/rib block. A space-saving design is achieved thereby, and this design is also functionally favorable because a cross flow of the air from a released region may not take place or only to a limited extend. As a result, a high effectiveness of the water removal is still given.

The cover device can include webs, which run between the end face of the tube/rib block and a carrier element, at/to which the air flow control element(s) is/are arranged or coupled. These webs are used to support the carrier element on the heat exchanger and to laterally delimit the regions to avoid cross flows.

The at least one air flow control element or the air flow control elements may be actuated individually, in groups, and/or together with the aid of at least one actuator. The driving action is made possible in a targeted manner to be able to apply air in a targeted manner as needed to the regions from which the water is to be removed. An individual actuation of air flow control elements may thus be achieved, or a combined actuation of air flow control elements linked to each other may take place.

A first air channel and a second air channel can be provided downstream from the tube/rib block, an air flow control element being provided with the aid of which the second air channel may be connected to the first air channel, so that air may be conducted from the second air channel into the first air channel, or the second air channel may be separated from the first air channel, so that the air from the second air channel may flow out independently of the first air channel. The air flow may be conducted thereby through the second air channel, either to the outside if it contains water to be removed or supplied to the first air channel if it does not contain any water and is to be used, for example, for heating. In the case of heating, the maximum surface area of the tube/rib block is used if no water is to be removed. In the case of a water removal, a considerable portion of the surface area of the tube/rib block may still be used, while the portion of the surface area for removing the water is temporarily decoupled from the heating system.

An exemplary embodiment of the invention further relates to a method for operating a heat exchanger according to the invention, the cover device, which is arranged downstream and/or upstream from the tube/rib block, is actuated for controlling the air flow through the tube/rib block temporarily and/or in certain regions for the defined removal of water from the tube/rib block in such a way that air is made to flow into the tube/rib block only in certain regions for the purpose of removing water, in that the cover device releases a through-flow of the tube/rib block in certain regions. Other regions are correspondingly blocked or not released, so that, for example, the entire air flow advantageously passes through the released region, and the removal of the water is thus very effective, due to the increased flow velocity in this region.

The regions or some regions of the tube/rib block and/or the cover device can be released consecutively in a targeted manner for the through-flow of the tube/rib block, so that water is removed from the tube/rib block in certain regions and, in particular, the corresponding regions are subsequently closed again until the water removal operation is completed. Correspondingly, in particular only that region or only those regions from which water is to be removed are released, after which they are subsequently closed again. Once the water removal process has been completed, all regions may be released again, and a temporary closure of the still open region is likewise, for example, not necessary.

It is also expedient if, in a first operating mode, the regions of the tube/rib block and/or the cover device are released consecutively from top to bottom for the through-flow of the tube/rib block and are, in particular, subsequently closed again. Water may be removed thereby from the entire tube/rib block, which is expedient, for example, in horizontally running tubes, since water does not easily run from top to bottom transversely to the tube longitudinal direction, because it may be bound in the ribs, for example corrugated ribs.

It is also expedient if, in a second operating mode, the lower region or the lower regions of the tube/rib block and/or the cover device is/are released for the through-flow of the tube/rib block. Water may be removed thereby from the tube/rib block only partially as needed, which is expedient, for example, in vertically running tubes, since water may then run along the tubs from top to bottom and accumulate at the bottom in the ribs, for example corrugated ribs.

The water and the air used to remove the water can be discharged into the surroundings or removed with the aid of an air channel open to the surroundings. The air volume laden with water may be conducted to the outside thereby, for example because it is unsuitable for heating an interior space.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The invention relates to a heat exchanger, in particular for a coolant or refrigerant circuit, in particular for a refrigerant circuit of an electrically driven motor vehicle, and a method for operating a heat exchanger of this type.

Figure 1:
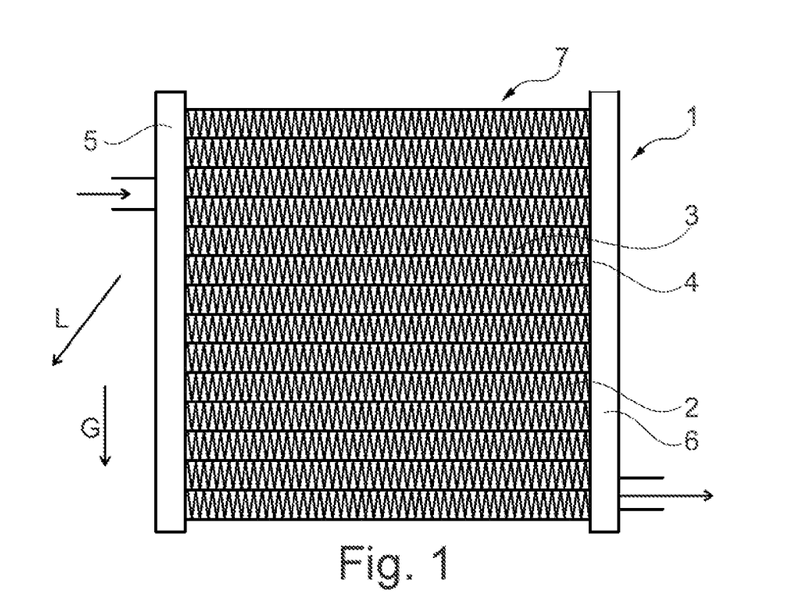
FIG. 1 is a schematic representation of an example of a heat exchanger according to the invention, including vertically arranged manifolds.

FIG. 1 shows a heat exchanger 1 according to a first exemplary embodiment, for example for a refrigerant circuit, in a frontal view against the air flow direction of air L, which flows through tube/rib block 2 of heat exchanger 1. Instead of refrigerant, another fluid may also be usable.

Heat exchanger 1 is a heat exchanger 1, for example, of a refrigerant circuit, which may be used, for example, in an electrically driven motor vehicle as a condenser or gas cooler for an air-conditioning mode and/or as an evaporator for a heat pump mode.

Heat exchanger 1 includes a tube/rib block 2, which has a multiplicity of tubes 3 and a multiplicity of ribs 4.

Tubes 3 are arranged essentially in parallel to each other and spaced a distance apart. Tubes 3 of tube/rib block 2 are oriented horizontally in the exemplary embodiment in FIG. 1, i.e., transversely to gravitational direction G.

Ribs 4 are each arranged between two adjacent tubes 3 and touch the two adjacent tubes 3 for the purpose of improving the heat transfer between the medium flowing through tubes 3, for example a refrigerant, and the air flowing between ribs 4. Ribs 4 are preferably designed as corrugated ribs.

Tube/rib block 2 includes at least one manifold 5 on one of the sides of tube/rib block 2, preferably two manifolds 5, 6 on both sides of tube/rib block 2 (cf. FIG. 1), which are oriented essentially in parallel to each other and at a right angle to tubes 3 or their longitudinal direction.

Manifolds 5, 6 are preferably used to supply and distribute fluid, for example refrigerant, into tubes 3 of tube/rib block 2 and/or to collect and conduct fluid out of tubes 3 of tube/rib block 2.

Cover device 7 arranged on the back side of tube/rib block 2 is not apparent in FIG. 1. In the exemplary embodiment in FIG. 1, this cover device 7 is arranged completely upstream from tube/rib block 2 or from the air flow. As an alternative to the complete upstream arrangement of a cover device 7, a complete arrangement of cover device 7 downstream from tube/rib block 2 may also generally be provided. As a further alternative, a partially upstream cover device 7 with a partially downstream cover device 7 may be provided. In this alternative situation, cover device 7 would be arranged partially on both sides of tube/rib block 2 in each case.

A cover device 7 of this type is used to control the air flow through tube/rib block 2 temporarily and/or in certain regions for the defined removal of water from tube/rib block 2.

Figure 2:
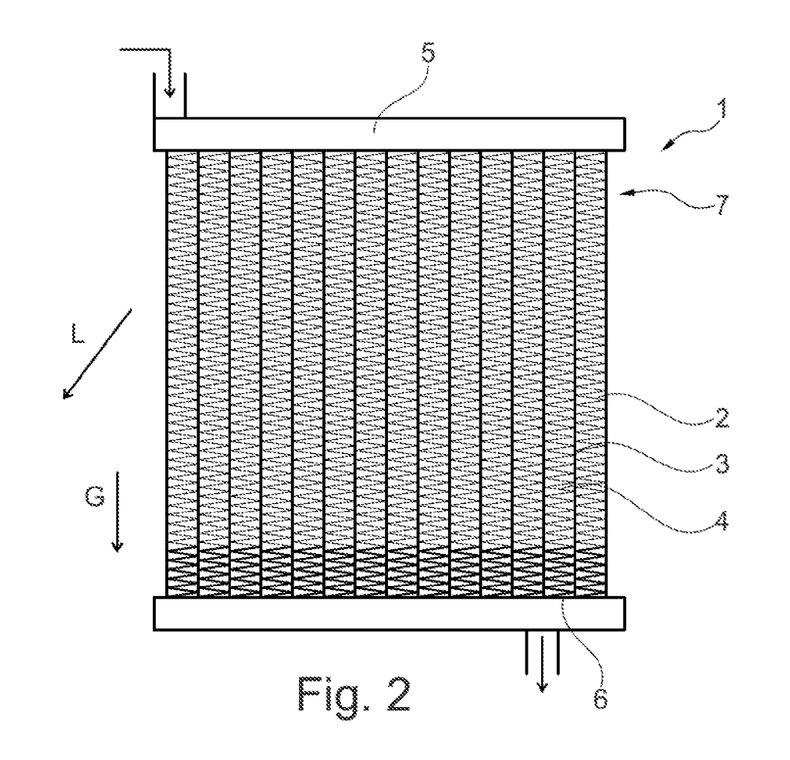
FIG. 2 is a schematic representation of an example of a heat exchanger according to the invention, including horizontally arranged manifolds.

FIG. 2 shows a heat exchanger 1 according to a second exemplary embodiment, for example for a refrigerant circuit, in a frontal view against the air flow direction of air L, which flows through tube/rib block 2 of heat exchanger 1. Instead of refrigerant, another fluid may also be usable.

Heat exchanger 1 is a heat exchanger 1, for example, of a refrigerant circuit, which may be used, for example, in an electrically driven motor vehicle as a condenser or gas cooler for an air-conditioning mode and/or as an evaporator for a heat pump mode.

Heat exchanger 1 includes a tube/rib block 2, which has a multiplicity of tubes 3 and a multiplicity of ribs 4.

Tubes 3 are arranged essentially in parallel to each other and spaced a distance apart. Tubes 3 of tube/rib block 2 are oriented vertically in the exemplary embodiment in FIG. 2, i.e., in parallel to gravitational direction G.

Ribs 4 are each arranged between two adjacent tubes 3 and touch the two adjacent tubes 3 for the purpose of improving the heat transfer between the medium flowing through tubes 3, for example a refrigerant, and the air flowing between ribs 4. Ribs 4 are preferably designed as corrugated ribs.

Tube/rib block 2 includes at least one manifold 5 on one of the sides of tube/rib block 2, preferably two manifolds 5, 6 on both sides of tube/rib block 2 (cf. FIG. 2), which are oriented essentially in parallel to each other and at a right angle to tubes 3 or their longitudinal direction.

Manifolds 5, 6 are preferably used to supply and distribute fluid, for example refrigerant, into tubes 3 of tube/rib block 2 and/or to collect and conduct fluid out of tubes 3 of tube/rib block 2.

Cover device 7 arranged on the back side of tube/rib block 2 is not apparent in FIG. 2. In the exemplary embodiment in FIG. 2, this cover device 7 is arranged completely upstream from tube/rib block 2. As an alternative to the complete upstream arrangement of a cover device 7, a complete arrangement of cover device 7 downstream from tube/rib block 2 may also generally be provided. As a further alternative, a partially upstream cover device 7 with a partially downstream cover device 7 may be provided. In this alternative situation, cover device 7 would be arranged partially on both sides of tube/rib block 2 in each case.

In each disclosed exemplary embodiment, the cover device may generally be arranged downstream for the heat exchanger, upstream from the heat exchanger or both partially upstream and partially downstream from the heat exchanger.

A cover device 7 of this type is used to control the air flow through tube/rib block 2 temporarily and/or in certain regions for the defined removal of water from tube/rib block 2.

Figure 3:
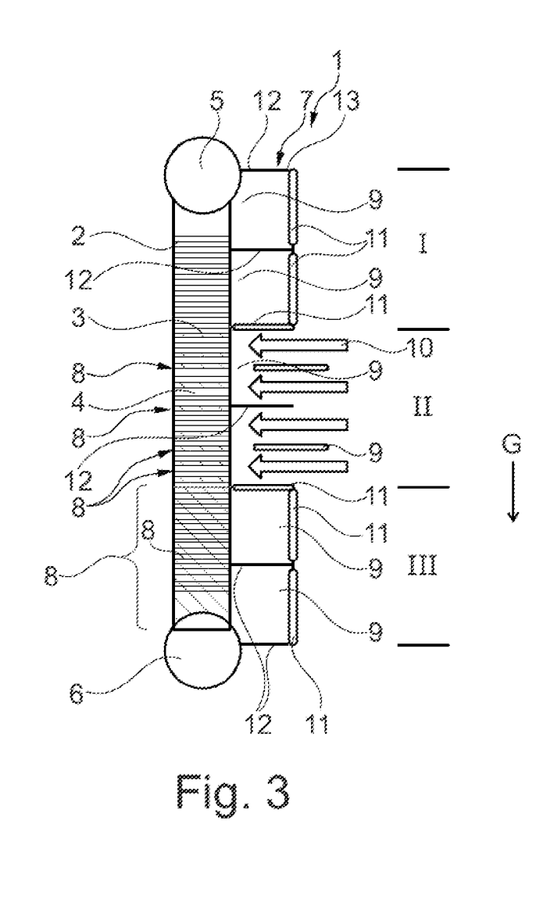
FIG. 3 is a schematic sectional representation of an example of a heat exchanger according to the invention.

FIG. 3 shows a heat exchanger 1 according to a third exemplary embodiment, for example, for a refrigerant circuit, in a sectional representation, in which the air flow of air L is oriented from right to left in FIG. 3, so that the air flows through tube/rib block 2 of heat exchanger 1 according to arrows 10. Instead of refrigerant, another fluid may also be usable.

Heat exchanger 1 in FIG. 3 is a heat exchanger 1, for example, of a refrigerant circuit, which may be used, for example, in an electrically driven motor vehicle as a condenser or gas cooler for an air-conditioning mode and/or as an evaporator for a heat pump mode.

Illustrated heat exchanger 1 includes a tube/rib block 2, which has a multiplicity of tubes 3 and a multiplicity of ribs 4. Tubes 3 are arranged essentially in parallel to each other and spaced a distance apart. Tubes 3 of tube/rib block 2 are oriented vertically in the exemplary embodiment in FIG. 3, i.e., in parallel to gravitational direction G. Ribs 4 designed, for example, as corrugated ribs, are each arranged between two adjacent tubes 3 and touch the two adjacent tubes 3 for the purpose if improving the heat transfer between the medium flowing through tubes 3, for example a refrigerant, and the air flowing between ribs 4. Ribs 4 are preferably designed as corrugated ribs.

Tube/rib block 2 includes at least one manifold 5 on one of the sides of tube/rib block 2, preferably two manifolds 5, 6 on both sides of tube/rib block 2 (cf. FIG. 3), which are oriented essentially in parallel to each other and at a right angle to tubes 3 or their longitudinal direction.

Manifolds 5, 6 are preferably used to supply and distribute fluid, for example refrigerant, into tubes 3 of tube/rib block 2 and/or to collect and conduct fluid out of tubes 3 of tube/rib block 2.

It is apparent in FIG. 3 that a cover device 7 is arranged on the air inflow side of tube/rib block 2. In the exemplary embodiment in FIG. 3, this cover device 7 is arranged completely upstream from tube/rib block 2.

As an alternative to the complete upstream arrangement of cover device 7, a complete arrangement of cover device 7 downstream from tube/rib block 2 may also generally be provided. As a further alternative, a partially upstream cover device 7 with a partially downstream cover device 7 may be provided. In this alternative situation, cover device 7 would be arranged partially on both sides of tube/rib block 2 in each case.

A cover device 7 of this type is used to control the air flow through tube/rib block 2 temporarily and/or in certain regions for the defined removal of water from tube/rib block 2.

It is apparent in FIG. 3 that tube/rib block 2 has a water accumulation 8 distributed to different rib regions, which is present essentially in the lower region of tube/rib block 2 and in the middle region of tube/rib block 2, however a certain water accumulation 8 also being detectable in the upper region of tube/rib block 2.

Since the water accumulation may form in different ways over tube/rib block 2, it is advantageous if the air for the through-flow may be correspondingly distributed.

For this purpose, cover device 7 includes a plurality of regions 9, to which air flow control elements 11 are assigned, which may be actuated individually, in groups, and/or together for the purpose of releasing or blocking an air flow through particular region 9, so that a region of tube/rib block 2 assigned to region 9 of cover device 7 has air flowing or not flowing through it.

A total of six regions 9 of cover device 7 are apparent as examples in FIG. 3, which are situated one on top of the other in the direction of G and which each delimit a corresponding region of tube/rib block 2. One air flow control element 11 is assigned to each of regions 9 of cover device 7 for the purpose of closing or blocking particular region 9 or of releasing particular region 9 to allow are to flow through it. Instead of the six regions 9 illustrated, more or fewer regions 9 may also be provided.

Air flow control elements 11 may be opened alone or in pairs or in groups, for example one after the other, so that an upper region 9 or upper regions 9 is/are opened first and through which air flows. Water may thus be blown out or discharged from the upper region of the tube/rib block. Afterwards, the opened region or opened regions is/are closed again and blocked for a through-flow. A region 9 arranged lower down or regions 9 arranged lower down may subsequently be opened and have air flowing through them, as illustrated in FIG. 3. Water from a region 9 or regions 9 of tube/rib block 2 arranged lower down may thus be blown out or discharged. Afterwards, opened area 9 or opened areas 9 is/are closed again and blocked for a through-flow. Further regions 9 down to the bottom-most region 9 may subsequently be opened and have air flowing through them, until bottom-most region 9 has also be opened and has air flowing through it. Afterwards, opened area 9 or opened areas 9 is/are closed again and blocked for a through-flow. Alternatively, for example after the through-flow of bottom-most region 9, a driving action may be carried out in such a way that all air flow control elements 11 are subsequently driven to open regions 9 in order to operate heat exchanger 1 normally.

As is apparent from FIG. 3, in the exemplary embodiment, a region 9 is made up of an air flow control element 11 and two partition walls 12, which divide region 9 upwardly or downwardly in the manner of an air channel and separate it from adjacent regions 9. Cover device 7 includes a number of partition walls 12 of this type and air flow control elements 11, to be able to separate the particular regions from each other.

Air flow control elements 11 are drivable and movable by at least one drive, for example with the aid of at least one electric motor, at least one hydraulic drive unit, or at least one pneumatic drive unit. This drive may be coupled with air flow control elements 11 via a gearing or the like, for example with the aid of cam disks or the like. A separate drive may also be assigned to each air flow control element 11, or one drive may be assigned in each case to groups of air flow control elements 11.

It is also apparent from FIG. 3 that air flow control elements 11 may be folded up by cover device 7 in the direction of tube/rib block 2.

In the exemplary embodiment illustrated in FIG. 3, six regions 9 are provided, which are arranged one above the other. Regions 9 may be opened individually one after the other for a through-flow and then closed again to open a different region 9 and allow it to be flowed through. Regions 9 may be driven, for example, in pairs, so that, for example, first the two upper regions 9 are driven as pair I, then the two middle regions 9 are driven as pair II, and finally the two lower regions 9 are driven as pair III.

Figure 4:
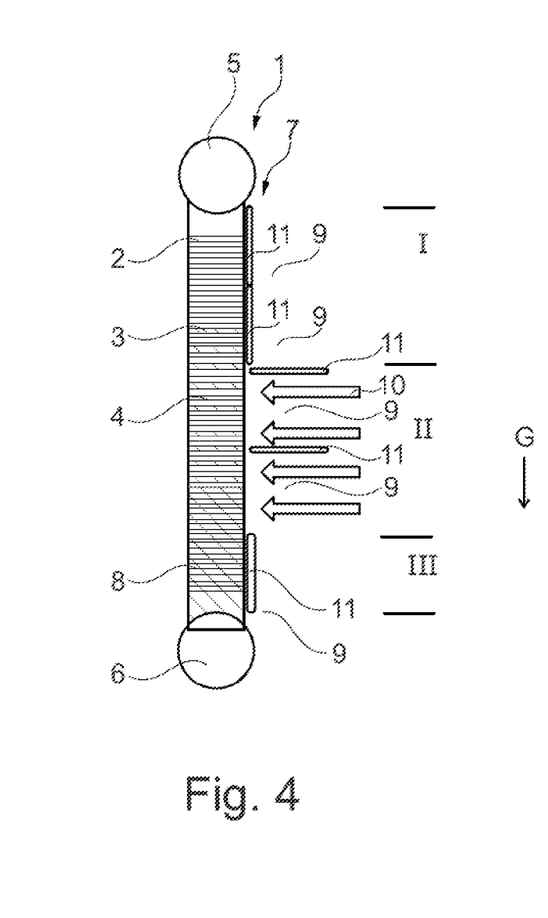
FIG. 4 is a schematic sectional representation of an example of a heat exchanger according to the invention.

FIG. 4 shows a fourth exemplary embodiment of a heat exchanger 1 according to the invention, which essentially has a design similar to that of heat exchanger 1 in FIG. 3, for which reason reference is made to the description relating thereto. However, the heat exchanger in FIG. 4 differs from the heat exchanger in FIG. 3 in that cover device 7 has five regions 9, in which the through-flow of the air through tube/rib block 2 is controlled with the aid of air flow control elements 11. The air flow control elements also essentially abut tube/rib block 2 in the closed state, and partition walls 12, which are arranged in the air flow direction in FIG. 3, are omitted in the exemplary embodiment in FIG. 4. Air flow control elements 11 are pivotably arranged in such a way that they pivot away from tube/rib block 2.

In the exemplary embodiment illustrated in FIG. 4, five regions 9 are provided, which are arranged one above the other. Regions 9 may be opened individually one after the other for a through-flow and then closed again to open a different region 9 and allow it to be flowed through. Regions 9 may be driven, for example, in pairs, so that, for example, first the two upper regions 9 are driven as pair I, then the two middle regions 9 are driven as pair II, and finally individual lower region 9 is driven as region III. Instead of the five regions 9 illustrated, more or fewer regions 9 may also be provided.

In the two exemplary embodiments shown in FIGS. 3 and 4, air flow control elements 11 are designed as valve elements. The valve elements are designed as a kind of vane valve having an articulated linkage to one end of the valve surface.

Alternatively, it may also be advantageous if individual or all air flow control elements 11 are designed as butterfly valves and/or as wing valves, which are, for example, rotatably coupled to a carrier element.

It may also be alternatively advantageous if at least one louver arrangement having a plurality of valves is formed as air flow control elements 11.

It may also alternatively be advantageous if cover device 7 comprises at least one rolling strip as air flow control element 11, which has at least one strip region with at least one through-opening, the strip region having a movable design, so that the at least one through-opening may be movably arranged in a defined manner along an end face of tube/rib block 2.

Cover device 7 of the exemplary embodiment in FIG. 4 is designed in such a way that it essentially directly abuts at least one end face of tube/rib block 2 or is arranged adjacent to at least one end face of tube/rib block 2.

In the exemplary embodiment in FIG. 3, cover element 7 is arranged in such a way that it and/or its air flow control elements 11 is/are arranged at a distance from at least one end face of tube/rib block 2. Cover device 7 may also include webs as partition walls 12, which run between the end face of tube/rib block 2 and a carrier element 13, at/to which air flow control element(s) 11 is/are arranged or coupled.

Figure 5:
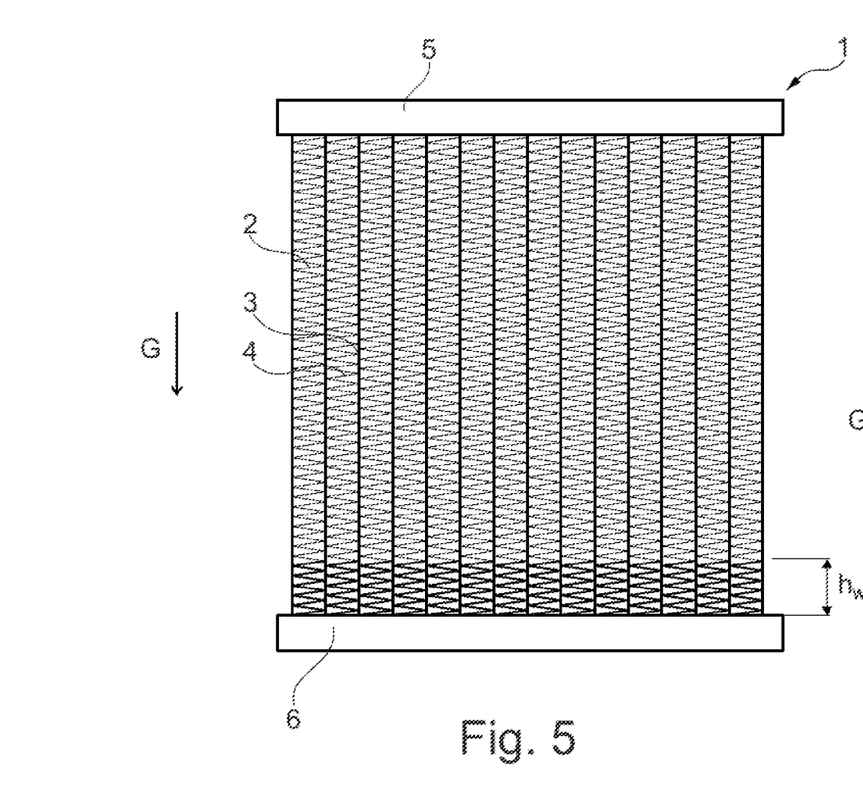
FIG. 5 is a schematic representation of an example of a heat exchanger according to the invention, including horizontally arranged manifolds.
Figure 6:
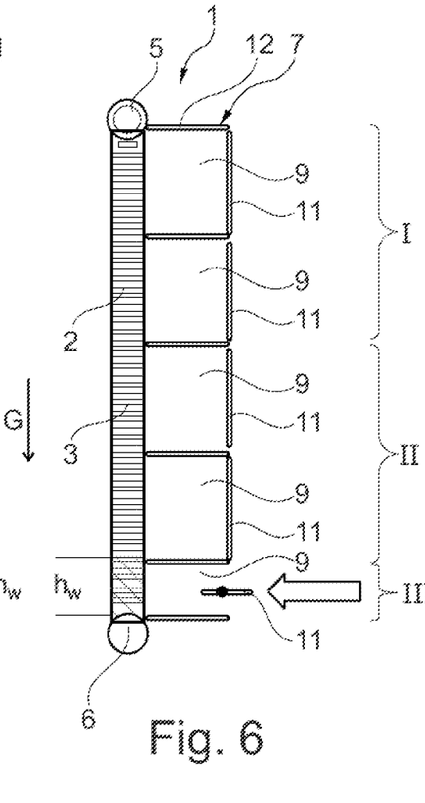
FIG. 6 is a schematic sectional representation of the heat exchanger in FIG. 5.

FIGS. 5 and 6 show different representations of a fifth exemplary embodiment of a heat exchanger 1 according to the invention, including horizontally arranged manifolds 5, 6 and vertically arranged tubes of tube/rib block 2.

FIGS. 5 and 6 show a fifth exemplary embodiment of a heat exchanger 1 according to the invention, which essentially has a design similar to that of heat exchanger 1 in FIG. 4 and the heat exchanger in FIG. 3, for which reason reference is made to the description of FIG. 4 and the description of FIG. 3 relating thereto. However, the heat exchanger in FIG. 5 differs from the heat exchanger in FIG. 4 in that cover device 7 has five regions 9, in which the through-flow of the air through tube/rib block 2 is controlled with the aid of air flow control elements 11, the vertical size or the vertical height of regions 9 and air flow control elements 11 is not the same, but rather lower region 9 has approximately half the height $h_W$ compared to the other regions 9, which are arranged above lower region 9. Instead of the five regions 9 illustrated, more or fewer regions 9 may also be provided.

The representation in FIG. 5 has five regions 9. However, this number of regions 9 is only an example. Any other number would also be possible. Height $h_W$ of lower region 9 is approximately half the height of the other regions 9 in the exemplary embodiment in FIG. 5. However, this is dependent on the particular structural conditions. Height $h_W$ is the height at which water accumulates in the rib or corrugated rib and does not flow out without external influence. The water also remains standing at this height even if no water is added from above. It is held in the rib or corrugated rib by the capillary forces. To blow out this water column, the lower element is approximately the same height as this water column $h_W$. A typical value is in the range from 5 mm to approximately 35 mm.

Air flow control elements 11 are arranged at a slight distance from tube/rib block 2 in the closed state, the distance being bridged by partition walls 12 as webs. Air flow control elements 11 are arranged in a pivotable manner. Lower air flow control element 11 is designed as a butterfly valve. Upper air flow control elements 11 are designed as butterfly valves or as the vane valve according to FIG. 3.

In the exemplary embodiment illustrated in FIG. 6, five regions 9 are provided, which are arranged one above the other. Regions 9 may be opened, for example, individually one after the other for a through-flow and then closed again afterwards to open another region 9 and allow it to be flowed through. Regions 9 may also be driven, for example, in pairs or in groups, so that, for example, first the two upper regions 9 are driven as pair I, then the two middle regions 9 are driven as pair II, and finally individual lower regions 9 is driven as region III. Instead of the five regions 9 disclosed in this regard, more or fewer regions 9 may also be provided.

Figure 7:
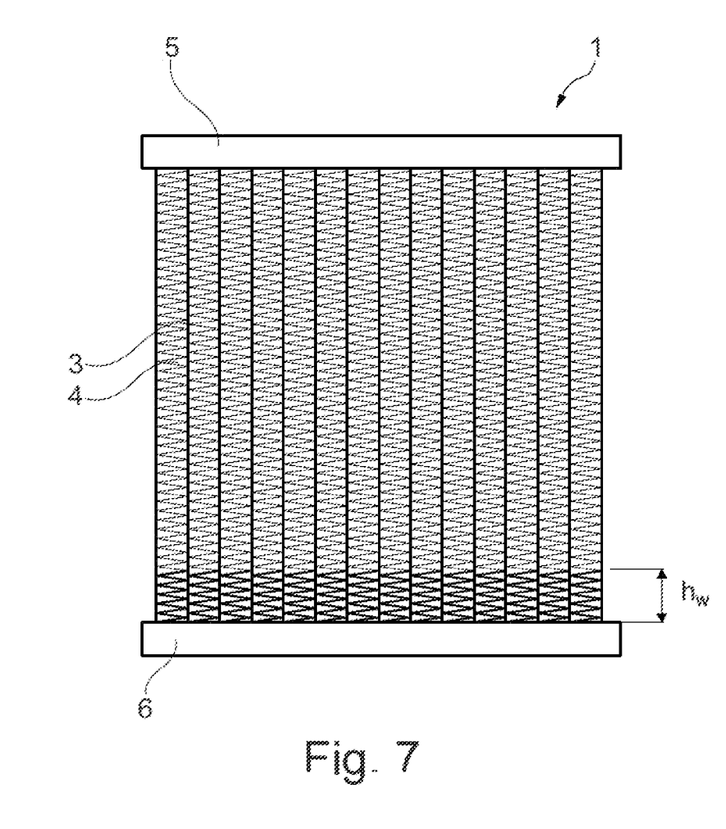
FIG. 7 is a schematic representation of an example of a heat exchanger according to the invention, including horizontally arranged manifolds.
Figure 8:
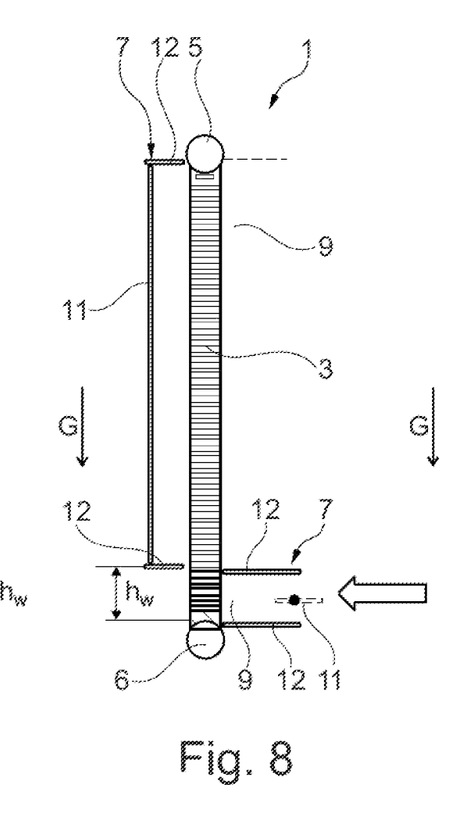
FIG. 8 is a schematic sectional representation of the heat exchanger according to the invention.

FIGS. 7 and 8 show different representations of a sixth exemplary embodiment of a heat exchanger 1 according to the invention, including horizontally arranged manifolds 5, 6 and vertically arranged tubes of tube/rib block 2.

FIGS. 7 and 8 show a sixth exemplary embodiment of a heat exchanger 1 according to the invention, which essentially has a design similar to that of heat exchanger 1 in FIGS. 5 and 6, heat exchanger 1 in FIG. 4, and heat exchanger 1 in FIG. 3, for which reason reference is made to the description in FIG. 4, FIGS. 5 and 6 relating thereto, and to the description of FIG. 3. However, the heat exchanger in FIGS. 7 and 8 differs from the heat exchanger in FIGS. 5 and 6 in that cover device 7 is arranged both partially downstream and partially upstream from tube/rib block 2.

Cover device 7 in FIG. 8 has two regions 9, upper region 9 being arranged downstream from heat exchanger 1, and lower region 9 being arranged upstream from heat exchanger 1. An air flow control element 11 is assigned to each of the two regions 9 for the purpose of controlling the air flow through regions 9.

The vertical size or the vertical height of regions 9 and air flow control elements 11 is not the same, but instead lower region 9 has a significantly shorter height $h_W$ compared to the other region 9 arranged above. Upper region 9 may be partially or completely closed with the aid of associated air flow control element 11. Lower region 9 may advantageously also be partially or completely closed with the aid of associated air flow control element 11. The discussion above with respect to FIG. 5 also applies to $h_W$.

Air flow control elements 11 are arranged at a slight distance from tube/rib block 2 in the closed state, the distance being bridged by partition walls 12 as webs. Lower air flow control element 11 is arranged in a pivotable manner, lower air flow control element 11 being designed, for example, as a butterfly valve. Upper air flow control element 11 is designed, for example, as a rolling strip. Other designs may also be provided here, for example those having multiple valve elements. In the case of a rolling strip, it would be advantageous, for example, if the rolling strip could be set to be completely open, open only over the height of $h_W$, and/or completely closed.

Figure 9:
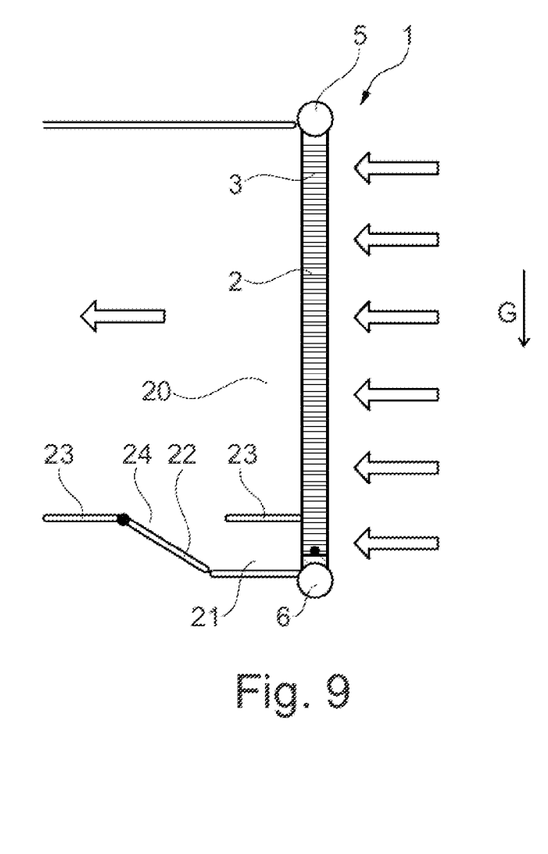
FIG. 9 is a schematic sectional representation of the heat exchanger according to the invention.
Figure 10:
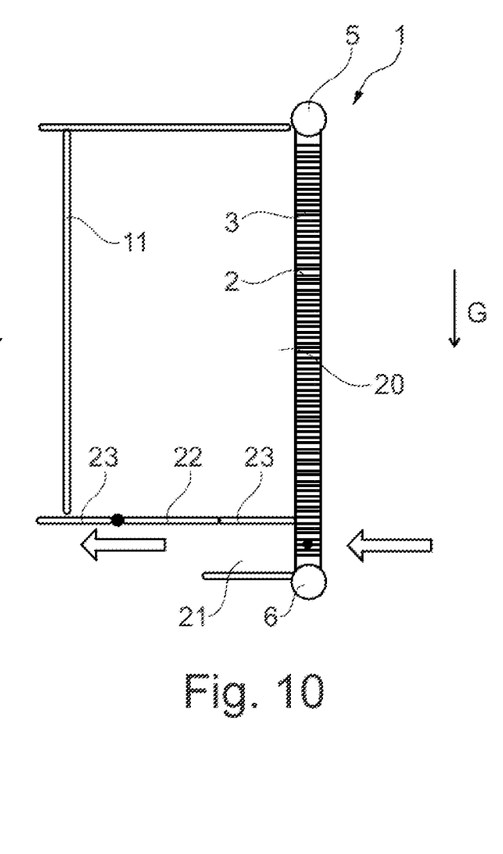
FIG. 10 is a schematic sectional representation of the heat exchanger according to the invention.

FIGS. 9 and 10 show different operating situations of a seventh exemplary embodiment of a heat exchanger 1 according to the invention, including horizontally arranged manifolds 5, 6 and vertically arranged tubes of tube/rib block 2.

FIGS. 9 and 10 show a seventh exemplary embodiment of a heat exchanger 1 according to the invention, which essentially has a design similar to that of heat exchanger 1 in the preceding figures, for which reason reference is made to the description relating thereto.

A first air channel 20 and a second air channel 21 are provided downstream from tube/rib block 2, which partially conduct the air flow passing through heat exchanger 1. A first air flow control element 11 is arranged in or assigned to first air channel 20, so that the air flow through heat exchanger 1 may be blocked in the first air channel.

An air flow control element for blocking second air channel 21 is not illustrated but would optionally also be possible.

However, an air flow control element 22 is provided, which is arranged in a partition wall 23 between first air channel 20 and second air channel 21.

Second air channel 21 may be connected to first air channel 20 via opening 24 with the aid of air flow control element 22, so that air is conductible out of second air channel 21 into first air channel 20 through opening 24 when air flow control element 22 releases the opening.

Second air channel 21 may also be disconnected from first air channel 20, so that the air from second air channel 21 is able to flow out independently of first air channel 20. The air of first air channel 20 may be supplied, for example, to an air-conditioning system of the interior of the motor vehicle, and the air of second air channel 21 may be supplied, for example, to the surroundings or the outside air of the motor vehicle or the like.

Heat exchanger 1 according to the invention may be operated with the aid of a method for operating a heat exchanger 1.

For this purpose, provided cover device 7, which is situated downstream and/or upstream from tube/rib block 2, is actuated for controlling the air flow through tube/rib block 2 temporarily and/or in certain regions for the defined removal of water from tube/rib block 2.

The actuation may take place in such a way that a tube/rib block 2 is provided with an air inflow only in certain regions for the purpose of removing water, in that cover device 7 releases a through-flow of tube/rib block 2 only in certain regions. The available air flow is reduced thereby to a smaller cross-section by a blower or by a fan, which effectuates a higher air velocity in the open region, which effectuates an improved blowing out of water from the released region of tube/rib block 2. If the released surface area of tube/rib block 2 is varied in a targeted manner, for example consecutively from top to bottom, either entire tube/rib block 2 is freed of water or a release may also take place only in regions 9 of tube/rib block 2 which are especially affected by water accumulations.

In one advantageous embodiment of the method, regions 9, all regions 9, or some regions 9 of tube/rib block 2 and/or of cover device 7 may thus be released consecutively in a targeted manner for the through-flow of tube/rib block 2, so that water is removed from tube/rib block 2 in certain regions, and, in particular, corresponding regions 9 are subsequently closed again.

In a first operating mode, regions 9 of tube/rib block 2 and/or cover device 7 may be released consecutively from top to bottom, individually or in groups, for the through-flow of tube/rib block 2 and, in particular, subsequently closed again. Tube/rib block 2 may thus be blown free of water from top to bottom.

In a second operating mode, lower region 9 or lower regions 9 of tube/rib block 2 and/or cover device 7 may be released for the through-flow of tube/rib block 2. Tube/rib block 2 may thus be blown free of water at least in one lower region 9 or in lower regions 9.

In a further exemplary embodiment, it may also be advantageous if the water and the air used to remove the water are discharged directly into the surroundings or removed with the aid of an air channel open to the surroundings. This achieves the fact that the water is not conducted into the interior of the motor vehicle and, for example, results in the windows of the motor vehicle fogging up in cold weather.

The invention being thus described, it will be obvious that the same may be varied in many ways. Such variations are not to be regarded as departure from the spirit and scope of the invention, and all such modifications as would be obvious to one skilled in the art are to be included within the scope of the following claims.

What is claimed is:

1. A heat exchanger of an electrically driven motor vehicle, the heat exchanger comprising:
   a tube-rib block having at least two tubes and at least two ribs, the tubes being arranged essentially in parallel to each other and spaced a distance apart, and the ribs each being arranged between two adjacent tubes, the ribs touching the two adjacent tubes;
   at least one manifold arranged on one of the sides of the tube/rib block for the supplying of fluid to the tubes of the tube/rib block and for removing the fluid from the tubes of the tube/rib block; and
   a cover device arranged downstream and/or upstream from the tube/rib block for controlling air flow through the tube/rib block temporarily or in certain regions of the tube/rib block for a defined removal of water from the tube/rib block,
   wherein the cover device has a plurality of regions, to which air flow control elements are assigned, which are adapted to be actuated individually, in groups, and/or together to release or block the air flow through the regions of the cover device so that a regions of the tube/rib block assigned to the regions of the cover device, respectively, have air flowing or not flowing therethrough.

2. The heat exchanger according to claim 1, wherein valve elements are provided as the air flow control elements, the valve elements being designed as vane valves, butterfly valves, and/or as wing valves, which are rotatably coupled to at least one carrier element.

3. The heat exchanger according to claim 1, wherein the air flow control elements are formed as at least one louver arrangement having a plurality of valves.

4. The heat exchanger according to claim 1, wherein the air flow control elements include at least one rolling strip, which has at least one strip region with at least one through-opening, the strip region being movable, so that the at least one through-opening is movably arranged in a defined manner along an end face of tube/rib block.

5. The heat exchanger according to claim 1, wherein the cover device essentially directly abuts at least one end face of the tube/rib block or is arranged adjacent to at least one end face of the tube/rib block or is arranged at a distance from at least one end face of the tube/rib block.

6. The heat exchanger according to claim 1, wherein the cover device is arranged at a distance from at least one end face of the tube/rib block, and wherein the cover device includes webs, which run between the at least one end face of the tube/rib block and a carrier element, on which at least one of the air flow control elements is arranged or linked.

7. The heat exchanger according to claim 1, wherein the air flow control elements are adapted to be actuated individually, in groups, and/or together by at least one actuator.

8. A heat exchanger of an electrically driven motor vehicle, the heat exchanger comprising:
   a tube-rib block having at least two tubes and at least two ribs, the tubes being arranged essentially in parallel to each other and spaced a distance apart, and the ribs each being arranged between two adjacent tubes, the ribs touching the two adjacent tubes;
   at least one manifold arranged on one of the sides of the tube/rib block for the supplying of fluid to the tubes of the tube/rib block and for removing the fluid from the tubes of the tube/rib block; and
   a cover device arranged downstream and/or upstream from the tube/rib block for controlling air flow through the tube/rib block temporarily or in certain regions of the tube/rib block for a defined removal of water from the tube/rib block,
   wherein a first air channel and a second air channel are provided downstream from the tube/rib block, an air flow control element being provided, by which the second air channel is connected to the first air channel so that air may be conducted out of the second air channel into the first air channel or by which the second air channel is disconnected from the first air channel so that the air from the second air channel is able to flow out independently of the first air channel.

9. A method for operating a heat exchanger that includes a tube-rib block having at least two tubes and at least two ribs, the tubes being arranged essentially in parallel to each other and spaced a distance apart, and the ribs each being arranged between two adjacent tubes, the ribs touching the two adjacent tubes, at least one manifold arranged on one of the sides of the tube/rib block for the supplying of fluid to the tubes of the tube/rib block and for removing the fluid from the tubes of the tube/rib block, and a cover device arranged downstream and/or upstream from the tube/rib block for controlling air flow through the tube/rib block temporarily or in certain regions of the tube/rib block for a defined removal of water from the tube/rib block, the method comprising:
   arranging the cover device downstream and/or upstream from the tube/rib block; and
   actuating the cover device for the control of the air flow through the tube/rib block temporarily or in the certain regions for the defined removal of water from the tube/rib block such that the cover device releases a through-flow of the tube/rib block in the certain regions so that the air flow is made to pass into the tube/rib block for removing water only in the certain regions.

10. The method according to claim 9, wherein the certain regions of the tube/rib block and/or the cover device is/are released consecutively in a targeted manner for the through-flow of the tube/rib block so that water is removed from the tube/rib block in the certain regions and then the certain regions are subsequently closed again, consecutively.

11. The method according to claim 10, wherein, in a first operating mode, the certain regions of the tube/rib block and/or the cover device are released consecutively from top to bottom for the through-flow of the tube/rib block and subsequently closed again.

12. The method according to claim 11, wherein, in a second operating mode, a lower region or lower regions of the tube/rib block and/or the cover device is/are released for the through-flow of the tube/rib block.

13. The method according to claim 9, wherein the water and the air used to remove the water are discharged directly into the surroundings or are discharged via an air channel open to the surroundings.

\* \* \* \* \*